United States Patent [19]

Wyatt, Sr.

[11] 4,327,497

[45] May 4, 1982

[54] MARINE COMPUTER

[76] Inventor: Robert H. Wyatt, Sr., 310 Castlewood Cir., Hyannis, Mass. 02601

[21] Appl. No.: 130,112

[22] Filed: Mar. 13, 1980

[51] Int. Cl.³ ............................................. G01C 21/22
[52] U.S. Cl. ..................................... 33/274; 33/1 SD; 33/431; 235/61 NV
[58] Field of Search ................ 33/1 SD, 1 SB, 1 SC, 33/1 R, 431, 274; 235/61 NV

[56] References Cited

U.S. PATENT DOCUMENTS

| | | | |
|---|---|---|---|
| 1,937,831 | 12/1933 | McCollum | 33/1 SD |
| 2,415,277 | 2/1947 | Caston | 33/1 SD |
| 2,916,207 | 12/1959 | Vohland | 33/1 SD |
| 2,991,555 | 7/1961 | Cambiaso | 33/1 SD |
| 3,526,963 | 9/1970 | Pansmith | 33/1 SD |
| 3,983,630 | 10/1976 | Hamm et al. | 33/1 SD |

FOREIGN PATENT DOCUMENTS 339388 8/1959 Switzerland ...................... 33/1 SD

*Primary Examiner*—William D. Martin, Jr.
*Attorney, Agent, or Firm*—Weingarten, Schurgin & Gagnebin

[57] ABSTRACT

A graphic vector plotting instrument, particularly suited for marine navigational computations. A cursor disk is surrounded by a concentric compass disk, and both are rotatable about their common center. The cursor disk has a pair of perpendicular cursor lines which intersect at the common center and a plurality of other parallel cursor lines. The compass disk has a 360° compass rose scale thereon. A transparent plotting slide is slidable over the cursor disk and the compass disk and contains scaled markings permitting the plotting and solution of navigational vector problems thereon without the aid of other devices or surfaces or charts.

25 Claims, 9 Drawing Figures

MARINE COMPUTER

FIELD OF THE INVENTION

The present invention relates generally to vector plotting devices and more particularly to graphic instruments for marine navigation and piloting.

BACKGROUND OF THE INVENTION

Navigation involves, among other things, the solution of vector triangles and the determination of a direction, a rate of travel, and the distance between two points for a moving object. These determinations must be repeated for each change of course heading, present position, current set and drift, and/or wind direction. Even for a short trip, the calculations can become voluminous. The labor needed for accurate piloting of a vessel has been reduced significantly by the use of mechanical aids which facilitate the drawing of the directional course line, maintaining reference lines to read the true heading directly from a compass rose scale, and providing fixed scales for mathematical computations.

Unfortunately, most navigational aids are limited in the functions they provide. Some solve only time, speed, and distance problems for a single vessel on a given course, and they are not capable of performing the calculations necessary to avoid or intersect a moving object. Examples of such devices are shown in U.S. Pat. Nos. 2,027,368; 2,280,485; 3,203,101; 3,231,188; 3,361,346; 3,625,417; and 3,862,398. Many such aids require an auxilliary chart or map upon which the vector plots must be drawn, such as in U.S. Pat. Nos. 1,113,717; 1,984,390; 3,059,339; 3,379,493; 3,496,640; 3,540,127; 3,643,333; and 3,881,253. Only a few devices offer an associated plotting surface upon which to draw course vectors lines, and when a plotting surface is provided, the scales and drawing area are small and require an additional surface onto which the plot may extend. Examples of such devices having a plotting surface are found in U.S. Pat. Nos. 1,984,390 and 3,540,127. All devices which use either auxilliary maps and charts or additional surfaces on which to extend the plotted vectors require the extrapolation of data from the plotting surface and separate interpolation onto a compass rose to obtain the proper course heading and speed. This makes navigation cumbersome, difficult, and inaccurate. Bearing these deficiencies in mind, the unique advantages of the present invention will become apparent.

SUMMARY OF THE INVENTION

Broadly speaking, the invention concerns a graphic plotting instrument for solving vector triangles involving marine navigational problems and more specifically includes a housing, a rotatably mounted outer compass disk, a rotatably mounted concentric inner cursor disk, and a transparent plotting slide. The outer compass disk has a compass rose scale on its outer face. Disposed on the outer surface of the inner cursor disk are a pair of perpendicular cursor lines intersecting at the common center and a plurality of parallel cursor lines not passing through the common center. Each respective disk is independently rotatable about their common center. The transparent plotting slide is disposed upon the housing and is freely slidable over the outer surfaces of the annular disk and the cursor disk, and it has a large surface for the plotting of vectors and a plurality of markings imprinted thereon including graduated parallel lines radial arcs, and radial lines.

The present invention offers particular advantages to the navigator over previously available devices. It provides a graphic vector plotting instrument upon which most required marine navigational problems may be solved, including calculations required to intersect or avoid a moving object. Furthermore, it is of sufficient size and is so scaled that neither additional instruments nor charts nor maps are required to perform the vector computations. Finally, it permits all such marine navigational problems to be solved easily and with high degree of accuracy. It should be noted that although the present invention is particularly suited to marine navigational problems, it could also be used for aircraft or other navigational calculations.

DESCRIPTION OF THE DRAWING

The present invention can be more fully understood from the following detailed description and accompanying drawing, in which.

DETAILED DESCRIPTION OF THE INVENTION

Figure 3:
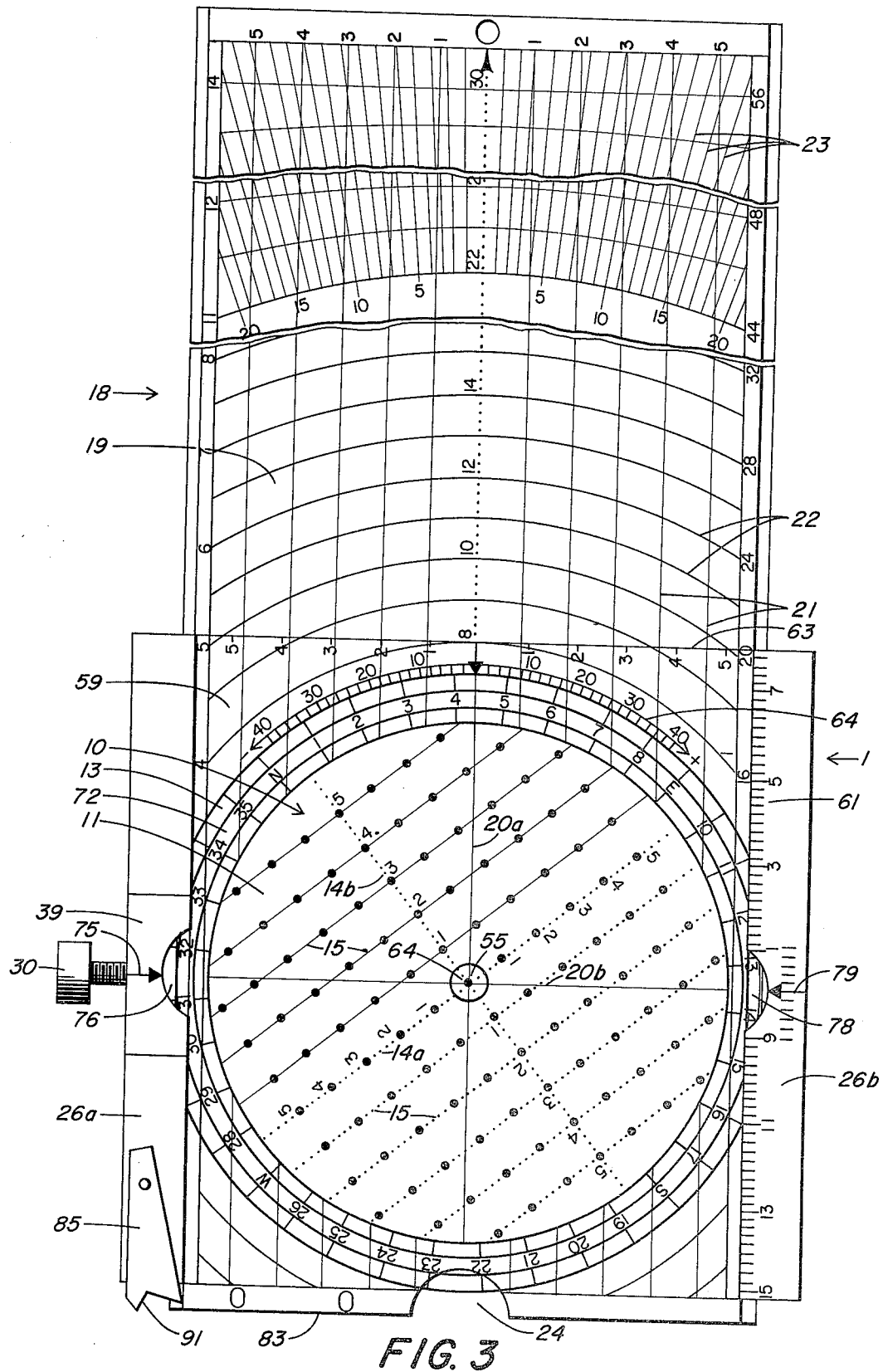
FIG. 3 is a top view of the embodiment of FIG. 1.

Referring to FIGS. 1-6, there appears a preferred embodiment of the present invention including, in part, a rectangular housing 1 having a first outer surface 2 and second outer surface 3. Disposed upon the first outer surface 2 of the housing 1 is a circular well 5 having at its center a housing aperture 6. Disposed within circular well 5 is an annular compass disk 7 having an outer diameter equal to that of well 5, and a diameter and a thickness which permits its outer face 13 to be flush with the first outer surface 2 of the housing 1. Primary disk 7 has a 360°. compass rose scale 72 which is imprinted on its outer face 13 adjacent to the edge of circular well 5 and which is adapted for the alignment of vectors such as course headings. Primary disk 7 is rotatably mounted within circular well 5 and can be turned freely in either a clockwise or counterclockwise direction, as shown in FIG. 3, independently of the housing 1. An arcuate pocket 25 is provided on housing 1 to facilitate rotation of disk 7 by a user. Primary disk 7 has on its outer face 13 a circular depression 8 concentrically disposed with respect to circular well 5 and a compass aperture 9 at its center which is aligned with the housing aperture 6 to form a single smooth bore.

Disposed within the circular depression 8 of compass disk 7 is a cursor disk 10 having an outer face 11 and an inner face 12. Cursor disk 10 has an outer diamater equal to the inner diameter of outer face 13 and a thickness which permits its outer face 11 to be flush with outer face 13 and the first outer surface 2 of the housing 1. The cursor disk 10 is rotatably mounted within the circular depression 8 of the compass disk 7 and can be independently and freely turned in either a clockwise or counterclockwise direction about aperture 9, as shown in FIG. 3. The first outer face 11 of the cursor disk 10 together with the outer face 13 of the compass disk 7 and the first outer surface 2 of the housing 1 form a single smooth uniform surface 59.

Figure 6:
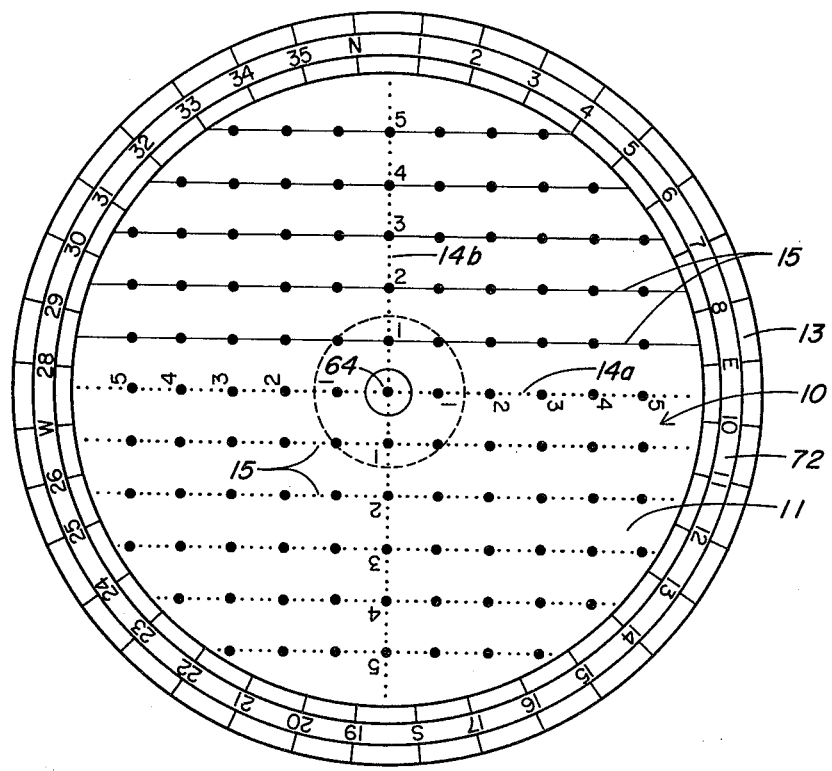
FIG. 6 is a top view of the annular disk and of the cursor disk of the embodiment of FIG. 1.

Referring to FIG. 6, there is shown first outer face 11 of cursor disk 10 which has a pair of intersecting center cursor lines 14a and 14b perpendicularly disposed to each other and intersecting at the center of cursor disk 10. Their point of intersection is referred to as compass center 64. Each center cursor line 14 is divided into equal segments by a plurality of spaced marks. A plurality of equally spaced parallel cursor lines 15 are also found on outer face 11 of cursor disk 10, and each cursor line 15 is parallel to one of cursor lines 14a and 14b and forms a chord on outer face 11. Lines 14a and 14b provide distance measurement scales, and the numbers associated therewith may represent any unit of measurement.

Cursor disk 10 has a circular base 16 on its inner face 12 concentrically disposed at the center thereof. A rectangularly-shaped elongated element 17 extends outwardly from the center of base 16. The circular base 16 is dimensioned to fit snugly within the compass aperture 9 and yet permit the cursor disk 10 to turn freely within the circular depression 8 of compass disk 7. The elongated element 17 extends through the aligned compass and housing apertures 6 and 9 and projects beyond the second outer surface 3 of housing 1.

Figure 7:
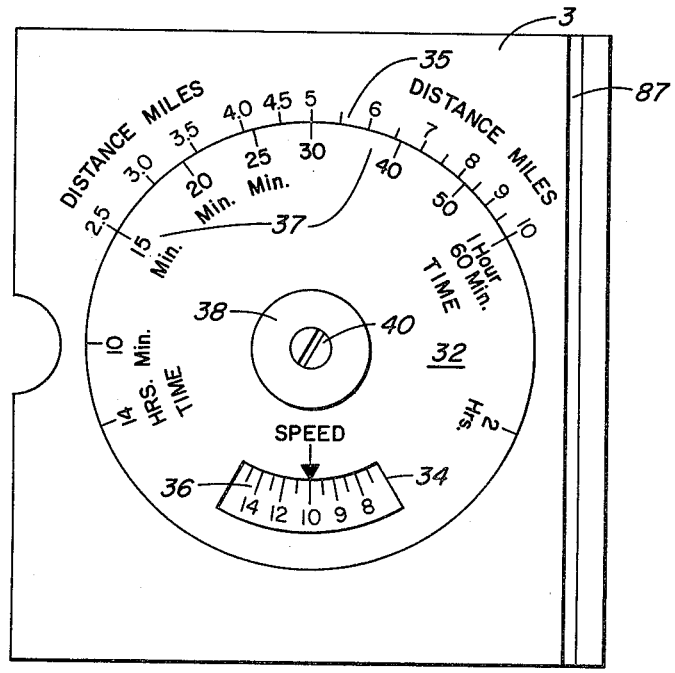
FIG. 7 is a pictorial view of the time-speed-distance (TSD) disk of the present invention.

The second outer surface 3 of housing 1 has a circular housing cavity 31 with housing aperture 6 passing through its center. Within the housing cavity 31 resides a rotatably mounted disk 32. Disk 32 has an outer diameter approximately equal to that of housing cavity 31 and a thickness which permits its outer face to be flush with the second outer surface 3 of housing 1. Disk 32 can be rotated freely in either a clockwise or counterclockwise direction, as shown in FIG. 7, independently of the housing 1. A rectangular slot 33 is disposed on the central axis of disk 32.

Rectangular slot 33 is aligned with aperture 6 and is shaped to permit elongated element 17 to project therethrough from apertures 6 and 9. Elongated element 17 extends slightly beyond the outer face of disk 32 and is captured within a similarly shaped rectangular groove 37 on a mounting support 38. A small bore 39 extending through groove 37 allows a support screw 40 to fasten the mounting support 38 to the elongated element 17 and clamp together the entire assembly which includes support 38, disk 10, disk 7, housing 1 and disk 32. Disk 32 is held and maintained in an aligned position by elongated element 17 and the mounting support 38. Support 38 serves as a knob for rotation of both cursor disk 10 and disk 32, and the rectangular shape of elongated element 17 and the matching shape of groove 37 insure that disk 10 moves in response to rotation of support 38. A knurled outer surface may be provided on support 38 to facilitate gripping thereof.

Figure 4:
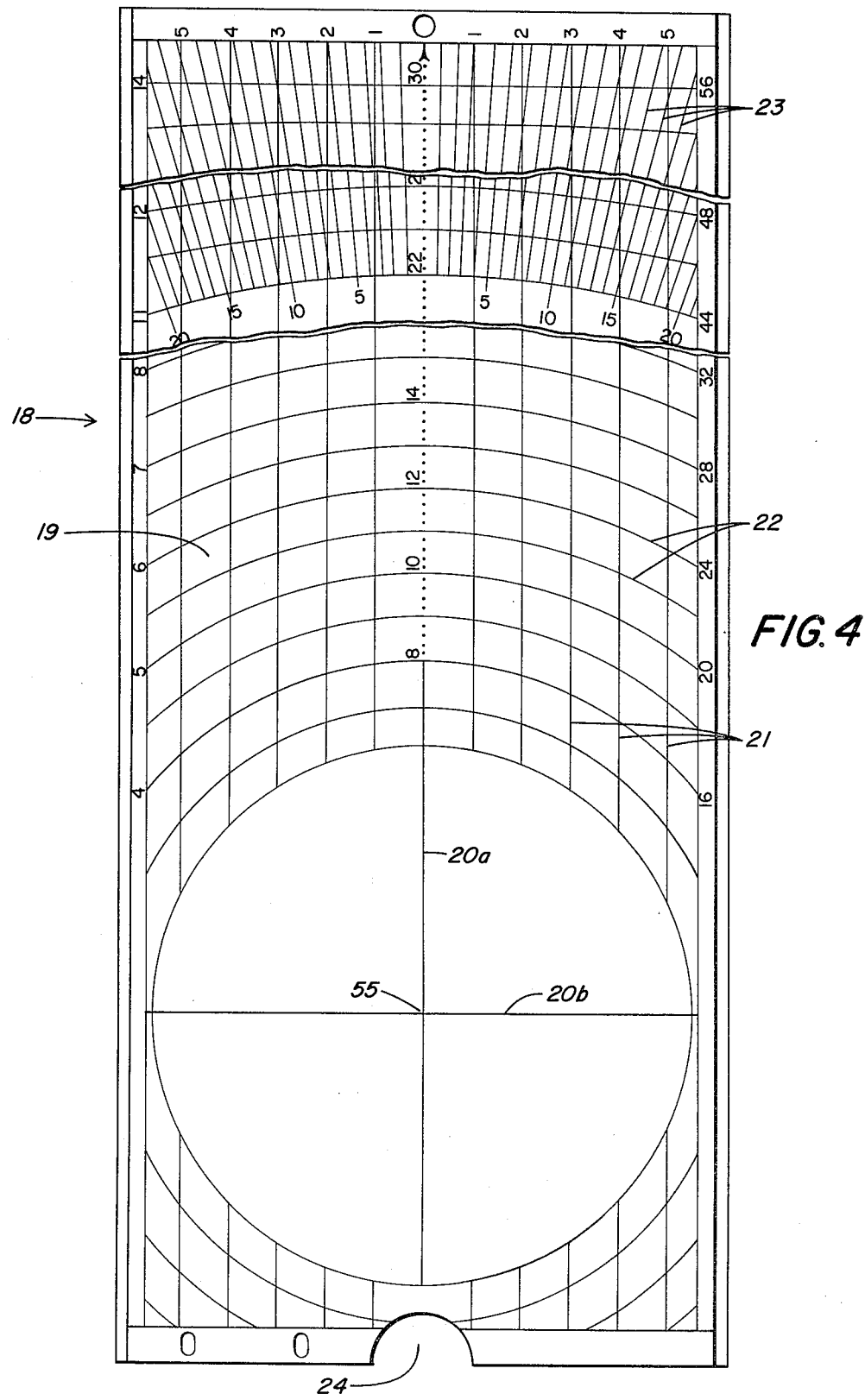
FIG. 4 is a top view of the slide of the embodiment of FIG. 1.

With specific reference now to FIGS. 1-4, a transparent rectangular plotting slide 18 having a plotting surface 19 is disposed upon and freely movable over the uniform surface 59. At the left end of slide 18 on surface 19, as shown in FIG. 4, are perpendicular intersecting overlay lines 20a and 20b. The point of intersection of lines 20a and 20b is referred to as "point zero" 55. Line 20a preferably extends longitudinally along the center of slide 18 from one end to the other. Lines 20a and 20b can be positioned to overlie center cursor lines 14 imprinted on outer face 11 of the cursor disk 10, so that point 55 coincides with compass center 64 and so that line 20a forms an extension of a cursor line 14a or 14b. Extending parallel to overlay line 20a on slide surface 19 are a plurality of parallel lines 21 which are spaced equally from one another across the width of slide 18. Lines 21 are preferably spaced an amount equal to the spacing of the marks on cursor lines 14. Lines 21 are intersected by a plurality of equally spaced, concentric, radial arcs 22 having point 55 as their common center. Arcs 22 divide line 20a and lines 21 into equal segments which are equal to the spacing of the marks on cursor lines 14, and the numbers along line 20a represent a continuation of those numbers on cursor lines 14. The numbers associated with lines 21 also correspond to the numbers on cursor lines 14. At the other end of the plotting slide surface 19 are a plurality of radial lines 23 extending to the furthermost edge of the slide surface 19. Lines 23 each radiate from point 55. The numbers associated therewith represent degrees of angle from line 20a and correspond to compass rose scale 72.

All the above lines are provided to facilitate the determination of vectors such as course headings and speeds on slide 18. Lines 21 indicate straight headings from a point on slide 18, while also providing a scale on plotting surface 19 for measurements at right angles to line 20a. Arcs 22 indicate radial distances from point 55 and lines 23 are radial headings from point 55. Line 20a indicates distances from point 55 or from compass center 64 if point 55 and the compass center coincide. Marking surface 19 on slide 18 is adapted for drawing course headings and reference lines and is movable with respect to one or more reference points on either the cursor disk 10 or the compass disk 7. The marking surface 19 need not be roughened to permit writing thereon with a grease pencil but may be roughened for use by other marking instruments. Slide 18 includes a semi-circular notch 24 at one end which can be aligned with the arcuate pocket 25 on the housing 1.

Figure 5:
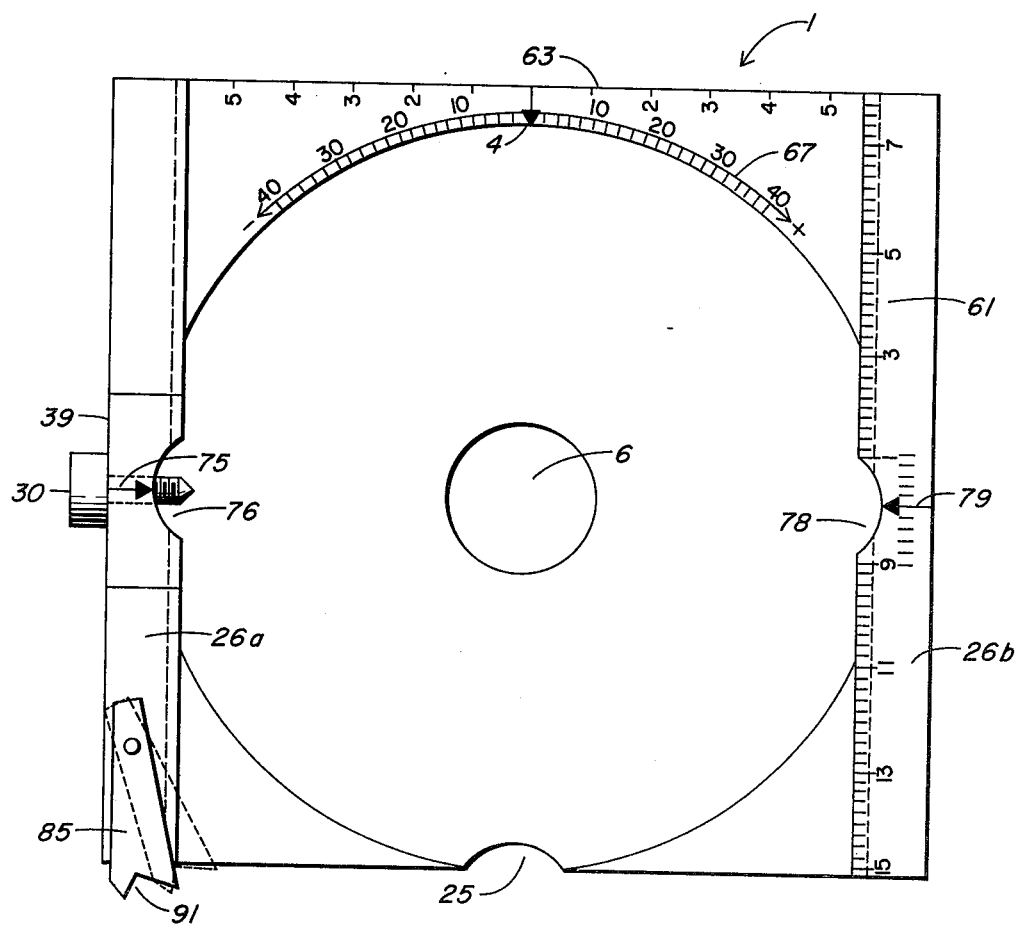
FIG. 5 is a top view of the housing of the embodiment of FIG. 1.

Plotting slide 18 is aligned and maintained in place and over the uniform unit surface 59 by parallel rails 26a and 26b affixed to the sides of the housing 1, as shown in FIG. 5. Parallel rails 26a and 26b have a narrow inner ledge 27 provided for this purpose. Inner ledge 27 of the rails 26a and 26b is slightly beveled at approximately a 20° angle as are the adjacent edges of slide 18. Parallel rails 26 may be adjusted using conventional means so that plotting slides having different widths or alignment requirements may be employed. At point 29, a set screw 30 may be inserted through the rail 26a and the housing 1. This set screw 30 may be tightened against disk 7 and permits the user to fix the position of disk 7 as required without fear of accidental movement thereof. Arcuate pockets 76 and 78 are provided in respective rails 26a and 26b to permit viewing of the compass rose scale 72 at those points. Rail 26a may have an easily removable insert 39 which is disposed above screw 30. Insert 39 is attached to surface 2 of housing by screws or by other commonly used means, and facilitates the removal of disk 7 for repair or replacement.

The housing is provided with an index point 4 which is adapted for alignment of the compass rose scale 72 and which lies directly beneath line 20a at the center of an edge of housing 1. Disposed on rails 26a and 26b at the center of pockets 76 and 78 are respective scribed lines 75 and 79. Lines 75 and 79 also serve to align compass rose scale 72 and form extensions of cursor lines 14 ninety degrees removed from index point 4. A linear scale 61 corresponding to the markings on cursor lines 14 may be provided along rail 26b parallel to lines 21. Another linear scale 63 also corresponding to the markings on cursor lines 14 may be provided on surface 2 of housing 1 beneath slide 18, and perpendicular to lines 21. Both scales 61 and 63 facilitate the determination of distances on slide 18. A scale 67 in degrees of arc may also be imprinted on housing 1 about the perimeter of compass rose scale 72. Scale 67 is centered about index point 4 and indicates degrees of arc on either side of point 4 and corresponds to lines 23.

Figure 1:
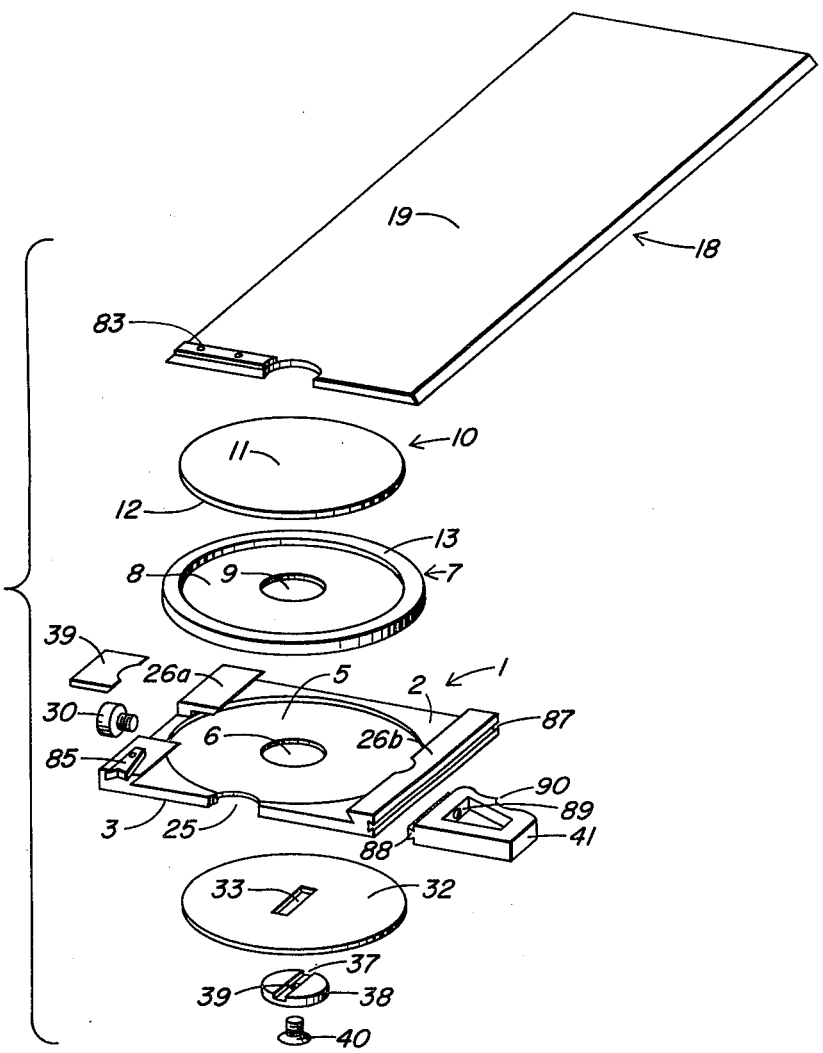
FIG. 1 is an exploded pictorial view of the preferred embodiment of the present invention.
Figure 2:
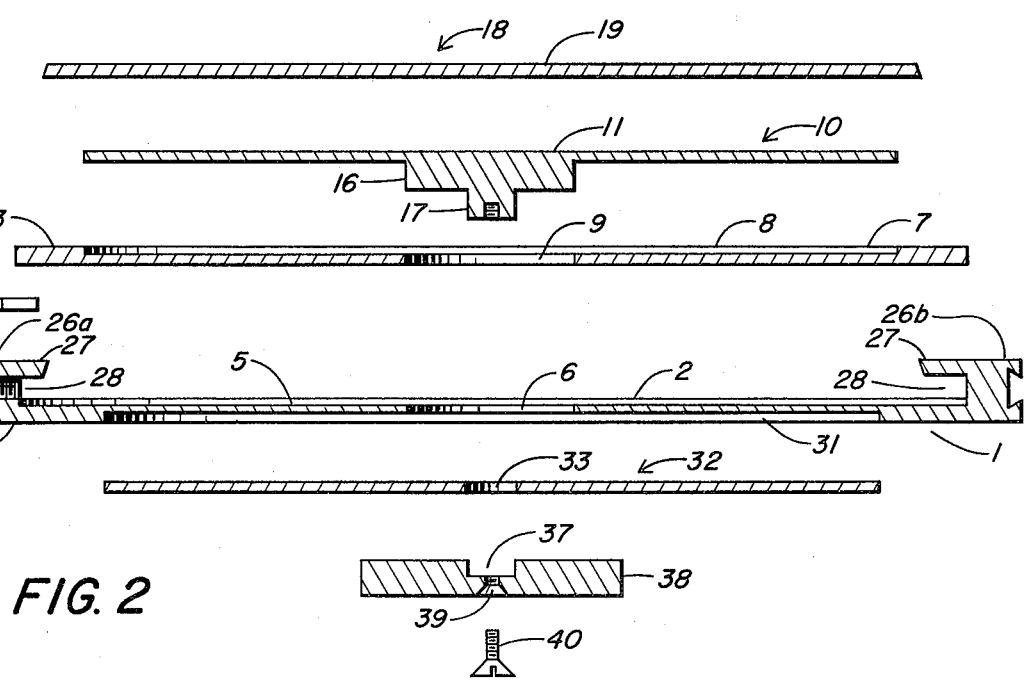
FIG. 2 is an exploded cross-sectional view of the embodiment of FIG. 1.

For added convenience during use, a handle may be affixed to housing 1 as shown in FIG. 1, or placed in position on outer face 3 of the housing, as in FIG. 7. Preferably handle 41 is slidably mounted in a dove-tail groove 87 formed on the side of the housing as shown in FIG. 1, or on outer surface 3. This groove mates with and captures projection 88 extending outwardly from handle 41. The location of handle 41 may be adjusted for convenience by sliding projection 88 in groove 87 to the desired position and handle 41 is retained in this desired position by locking screw 89. Notches 90 conforming to the shape of a users fingers may be provided for convenience.

A stop 83 may be provided on the left end of slide 18, as shown in FIG. 3, to permit point 55 to be quickly and easily aligned with the compass center. A cooperating detent arm 85 is pivotably mounted at one end thereof to rail 26a. Arm 85 is provided at its distal end with a notch 91 adapted to accomodate stop 83. Stop 83 is typically a raised strip across the end of slide 18 and notch 91 is adapted to abut one corner of stop 83. Arm 85 has a length such that point 55 and the compass center are aligned when notch 91 engages stop 83.

In an alternative embodiment, as shown in FIG. 7, disk 32 may be provided with a time-speed-distance (hereinafter TSD) scale for the convenience of the user. Arrayed around the perimeter of cavity 31 on second outer surface 3 is a distance scale 35. A time scale 37 is arrayed around the outer perimeter of disk 32 adjacent scale 35, and a speed scale 36 is printed onto surface 3 of housing cavity 31. The speed scale is viewed through an aperture 34 in disk 32, and an arrow and the legend "Speed" indicate where the reading is to be taken. Disk 32 is rotated by means of support 38, as previously described, to provide the user with a travel time, speed or distance when given values for two of the three variables.

The advantages offered by the present invention and the operation thereof are best demonstrated by solving several common navigational problems.

Problem One: When the current drift is southeasterly (135°) at a speed of 3 knots, determine:

(a) For a course of due north (0°) and a boat speed of 12 knots, the effect of the current drift after one hour when no correction is made for same;

(b) A course and speed needed to arrive at a point 12 miles distant from the departure point on a due Northerly course in one hour; and (c) At a boat speed of 12 knots, what distance can be traveled to arrive a point due north of the departure point in one hour and what is the required heading.

Solution: This problem is solved by the use of vector triangles as follows. The plotting slide 18 is positioned so that point 55 is directly over the compass center. Compass rose scale 72 is turned until the desired course, due north or 0°, is adjacent to and aligned with Index Point 4 on housing 1, and disk 7 is secured in place by set screw 30. This setting represents the desired course or "track line reference". The cursor disk 10 is now turned until one of the center cursor lines 14 is positioned at 135° or southeast, adjacent to the compass rose scale 72. The setting 135° is the direction of the current drift, and the aligned center cursor line 14 becomes the "current set reference". Each graduated division of the aligned center cursor line 14 is taken to represent one knot. Three units in a southeasterly direction is measured along the aligned center cursor line 14 from the compass center. That spot which represents three knots of current, is visible through the transparent plotting slide 18 and is marked on the plotting surface 19 as point C. This point and the spot on the cursor disk 10 representing 3 knots for current should be identically aligned. The plotting slide 18 is moved leftwardly, as shown in FIG. 4, and the twelfth divisional unit marking of line 20a is brought over compass center 64. Each divisional unit marking on line 20a is taken to represent a rate of 1 knot. After aligning the twelfth unit marking over the compass center, three units are measured again on slide 18 in a southeasterly direction from the compass center along the current set reference, and that spot is marked on the plotting slide surface 19 as point A. While holding the twelfth unit marking of the linear scale on the compass center, 3 units is measured on the other side of the compass center on the current set reference directly opposite to point A. A mark is made on the plotting surface 19 and designated Point B. The lines point 55 to A, point 55 to B, and A to B are then drawn on plotting surface 19.

The line point 55 to A read from surface 19 when the compass center and point 55 are aligned, shows a course of 12° and a distance of 10.2 nautical miles. Point A represents the vessel's position after one hour with no correction made for the current.

The line point 55 to B read from surface 19 when the compass center and point 55 are aligned shows a 352° heading. The line point 55 to B represents the course to be steered in order to be 12 nautical miles distant from the departure point on a due northerly course after one hour. However, point B shows a speed of 12 knots plus 2.3 knots equaling 14.3 knots. Thus, 14.3 knots would be the required actual boat speed in order to be 12 nautical miles distant in one hour.

If 2.3 knots is subtracted from 12 knots, the difference is 9.7 knots. 9.7 knots is measured from point 55 on the central linear scale 20a, the due north track line, and that spot is marked as point D. The plotting slide 18 is moved leftwardly, in FIG. 3, and point D is aligned over the compass center. A line is drawn from point C to point D and the cursor disk 10 is turned until one of the cursor lines is parallel to the C—D line. The heading represented by this line is read directly from the compass rose scale. This line shows a 349° heading and is the course to be steered at an actual boat speed of 12 knots for one hour to reach a position 9.7 nautical miles distant from the departure point on the due North course heading.

Note that the speed of advance needed to solve the Part (b) problem is 2.3 knots more than the actual boat speed, here given as 12 knots. Therefore, the speed of advance to solve the part (c) problem is 2.3 knots less than the boat speed of 12 knots, and any other type (c) problem would be in a similar way. That is, if the particular type (b) problem calls for a speed of 2.3 knots more than actual boat speed of 12 knots as in this case, then speed of advance (S.O.A.) for the type (c) problem is 12 knots, less 2.3 knots, or 9.7 knots. The SOA for (c) is always equal and opposite to the speed adjustment called for in the type (b) problem.

Problem two: Determine the direction and velocity of the true wind when the boat course is 90° and its speed is 15 knots, and when the apparent wind is NE at 20 knots.

Solution: Because wind vector problems often involve large quantities, it is desirable to reduce the scale of cursors 14 so that the plots and computations may all be done within the physical confines of slide 18. The same could have been done for the previous problem, but it is not necessary to do so. For the purposes of this problem, each mark on the cursor 14 and on the line 20a represents 5 knots.

First, the compass rose scale 72 is rotated so that the 90° mark is aligned with index point 4. A cursor line 14 is aligned with center line 20a and a mark designated point B is made on surface 19 three units (15 knots) away from point 55 toward index point 4. A cursor line 14 is then rotated until it is positioned at a NE-SW heading. The slide 18 is then moved to the left, in FIG. 3 until point B is directly over the compass center. A mark is made four units (20 knots) away from the compass center towards the SW on a cursor line 14 and it is designated point A. Next, slide 18 is moved until the compass center and point 55 are aligned. Then the disk 10 is turned until a cursor line 14 passes through point A, and the direction of the true wind is found from the alignment of that cursor line 14, or 356° (not 176°) which may be read from the compass rose scale 72 on primary disk 7. The speed of the true wind is the distance from point 55 to point A or 14 knots.

Problem three: If the course of the boat is 105°, its speed is 15 knots and the boat picks up a radar contact at 0000 hours at a bearing of 135° and a distance of six nautical miles, and the boat picks up the same radar contact at 0006 hours at a bearing of 135° and a distance of four nautical miles, determine the relative course and speed of the radar contact, and the true course and speed thereof.

Solution: Point 55 and the compass center are aligned and the compass rose scale 72 is positioned so that the boat course, or 105°, is opposite line 75. A cursor line 14 is then aligned with the 135° mark on the compass rose scale. Six units (point A) and four units (Point B) are marked towards 135° from the compass center along cursor line 14 on slide surface 19. The boat and the radar contact closed two nautical miles in six minutes with no change in heading, so that the relative speed of the radar contact is 20 knots and it is on a collision course with the boat.

The distance travelled by the boat in six minutes or 1.5 nautical miles is marked as Point C on slide surface 19 from point A parallel to the 105° heading of the boat. Slide 18 is moved until point 55 is aligned with the compass center and cursor disk 10 is rotated until one of parallel cursor lines 15 is disposed so that it passes through points B and C. The cursor line 15 from point C to point B represents the true course and speed of the radar contact and this true course can be determined from a parallel cursor line 14 where it touches compass rose scale 72. The true course of the radar contact is 358°. To determine the true speed of the radar contact, slide 18 is moved until the line point C to point B is positioned over a scale on a cursor line 14 or a parallel line 15. This true speed is determined to be 12 knots.

It should be noted that each of the above marine navigational problems was resolved without the use of maps or charts in conjunction with the present invention and without the need of additional instruments or devices to perform any of the pertinent computations. Furthermore, in each case, all problems were solved by the plotting of vector diagrams which did not extend beyond the confines of slide 18 and which could be accurately drawn only with the markings provided on the instrument. The results were obtained very quickly and with a high degree of accuracy, regardless of the scale used. These same sort of computations may also be performed for a sailboat, for aircraft, or for any other moving vessel.

Figure 8:
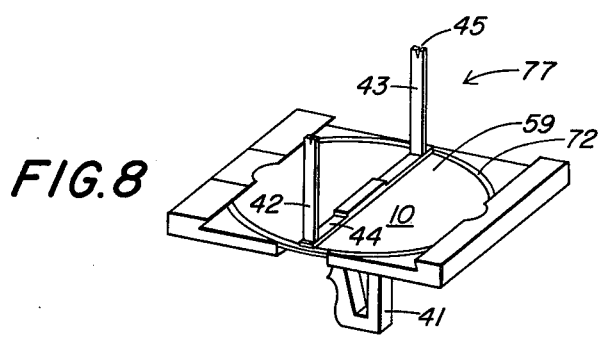
FIG. 8 is a pictorial view of the sight vane of the present invention.

In another embodiment, the present invention may be modified to serve as a "Pelorus" to take relative bearings of objects, or to provide true course headings for any visible destination point. Referring to FIG. 8, a sight vane 77 is provided in conjunction with the embodiment of FIGS. 1-6. The sight vane comprises first and second rectangular vanes 42 and 43 extending upwardly away from surface 59 parallel to each other from opposite ends of a rectangular support member 44. The first vane 42 has a plurality of scribed lines on its surface (not shown) along its upwardly extending longitudinal axis; the second vane 43 has a V-shaped viewing notch 45 on its distal end. The sight vane 77 is attached at the center of support member 44 to the center of the secondary disk 10, or compass center 64 and is rotatable about the compass center to permit vanes 42 and 43 to be aligned with the compass rose scale 72 on compass disk 7. To use the sight vane, the plotting slide 18 is removed and the housing is placed with either point 4, point 75, or point 79, facing in a due northerly direction, depending on which is most convenient. The compass rose scale is positioned so that due North, 0°, is aligned with either of the aforementioned points. The sight vane 77 resting on the cursor disk 10 may be rotated to any desired heading merely by turning disk 10. By sighting across the first and second vanes 42 and 43 to the visible destination point so that the destination point is positioned in notch 45, the proper course heading may then be read directly from the compass rose scale. The handle 41 may, if desired, be removed from its position in FIG. 1 and attached to housing 1, using the dove-tail arrangement provided therefor on second outer surface 3. The handle 41 is shown in such a position in FIG. 8.

Figure 9:
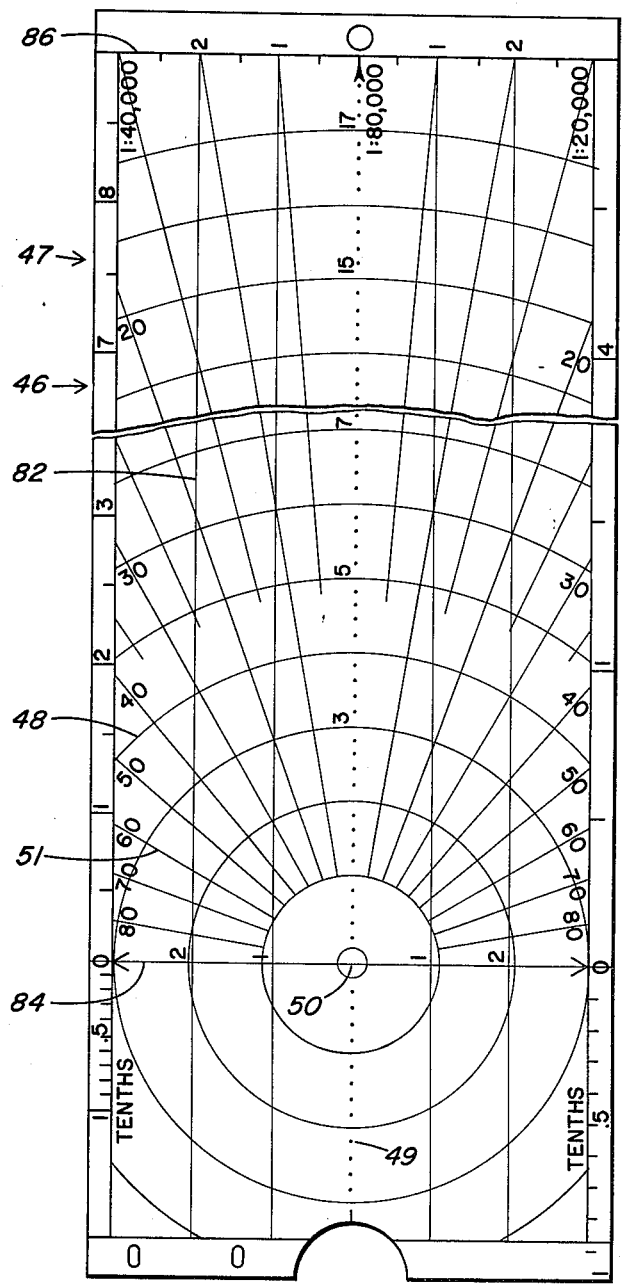
FIG. 9 is a top view of the optional plotting slide of the present invention.

The present invention may also be modified to perform the function of a chart protractor by providing an optional plotting slide 46 shown in FIG. 9. The optional slide surface 47 includes a number of equally spaced concentric rings 48 centered about point 50 to provide a radial distance scale, and a graduated linear scale 49 extending through point 50 longitudinally along the center of slide 46, and parallel to the direction of movement of slide 46. Lines 82 drawn parallel to scale 49 provide a transverse scale on a line 84 which passes through point 50, and on line 86 at the right end of slide 46, as shown in FIG. 9. Lines 82 also permit longitudinal alignment of slide 46 or of points therealong. Intersecting concentric rings 48 and linear scale 49 are a series of radial lines 51 extending from point 50 at 5° and 10° intervals. When employed as a protractor, the optional slide 46 is first placed on a navigational chart with point 50 positioned over the point of departure, designated point A, and with the linear scale 49 extending through the desired destination point on the chart, designated point B. Point B and a line through point A representing a north-south heading on the chart are marked on the optional slide surface 47. The optional slide 46 is then inserted onto the housing 1 through rails 26a and 26b. The cursor disk 10 is rotated until one of the center cursor lines 14 on its outer face is aligned with the north-south chart heading on the optional slide surface. The primary disk 7 is turned until due North (0°), is aligned directly beneath the center cursor line 14 which lies parallel to the north-south axis line. This procedure aligns the compass rose scale with the north-south heading. Point A is placed at compass center 64 and the angle between the north-south heading and scale 49 gives the required heading in degrees of angle on the compass rose scale. By correlating the chart distance scale with the divisions on the linear scale 49, the precise distance from the departure point to the destination point can also be determined directly.

The housing 1, compass disk 7, and cursor disk 10 can be formed using any durable, light-weight material. The housing, primary disk, and secondary disk may have any convenient dimensions, so long as the proper relationships are present. Although rails 26a and 26b are used in the preferred embodiment of the invention, any other alignment means may be employed so long as the plotting slide passes unhindered over the respective disks along a predetermined line of movement. In addition, compass disk 7 need only be an annular ring rotatably disposed between disk 10 and surface 2, and disk 7 need not have circular depression 8.

The present invention is not to be limited in scope nor restricted in form except by the claims appended hereto.

What is claimed is:

1. A graphic plotting instrument for solving navigational vector problems comprising:
    a housing having a first side with a well formed therein and a second side;
    a cursor disc disposed within said well formed on said first side of said housing and being rotatable about a central point, said cursor disc having a plurality of scaled cursor lines on an outer face thereof;
    a compass disc mounted in said well formed on said first side of said housing concentrically with said cursor disc and being rotatable independently of said housing and of said cursor disc, said compass disc having an annular face visible from said first side of said housing and disposed between the outer perimeter of said cursor disc and the outer perimeter of said well, said annular face having a compass rose scale displayed thereon; and
    an elongated, transparent plotting slide disposed upon said first side of said housing and being freely slidable over said annular face of said compass disc and said outer face of said cursor disc, said plotting slide being adapted for plotting thereon; and
    rotation means secured to said cursor disc and extending through said housing to have an end projecting from said second side of said housing, said rotation means permitting manual rotation of said cursor disc by force applied to said end of said rotation means on said second side of said housing.

2. A graphic plotting instrument as recited in claim 1 further comprising means for guiding movement of said plotting slide.

3. The graphic plotting instrument as recited in claim 2 wherein said guiding means comprise two parallel spaced rails disposed on said first side of said housing and capturing said slide therebetween.

4. A graphic plotting instrument as recited in claim 1 wherein said slide has a plurality of surface markings thereon.

5. A graphic plotting instrument as recited in claim 4 wherein said surface markings comprise a pair of orthogonal lines intersecting at a first point, one of said orthogonal lines being longitudinally disposed parallel to the direction of sliding of said slide and being positioned at the transverse center of said slide, said first point being alignable with said central point by movement of said slide.

6. A graphic plotting instrument as recited in claim 5 wherein said plurality of surface markings on said plotting slide further comprise scaled, radial arcs having said first point at their common center, radial lines emanating from said first point, and longitudinal lines parallel to said one orthogonal line.

7. A graphic plotting instrument as recited in claim 1 or 6 wherein two of said cursor lines are orthogonal and intersect at said central point.

8. A graphic plotting instrument as recited in claim 7 wherein others of said cursor lines are parallel to at least one of said orthogonal cursor lines and form a chord on said outer face of said cursor disk.

9. A graphic plotting instrument as recited in claim 5 further comprising detent means for aligning said first point with said central point.

10. A graphic plotting instrument as recited in claim 9 wherein said detent means comprise a pivotally mounted arm disposed on said first side of said housing and having a notch formed in a free end thereof and a cooperating projection disposed on said slide and engagable by said notch in said free end of said arm.

11. A graphic plotting instrument as recited in claim 1 further comprising a third disc rotatably mounted on said second side of said housing and being rotatable with said cursor disc by said rotation means to provide the value of one of the three variables of time, speed and distance when the values of the other two of said three variables are known.

12. A graphic plotting instrument as recited in claim 1 further comprising means to secure said compass disk in a desired position.

13. A graphic plotting instrument as recited in claim 1 further comprising adjustable handle means.

14. A graphic plotting instrument as recited in claim 13 wherein said handle means are slidably disposed on said second side of said housing.

15. A graphic plotting instrument as recited in claim 13 wherein said handle means are slidably disposed along a lateral edge of said housing.

16. A graphic plotting instrument as recited in claim 1 further comprising an arcuate pocket on a lateral side of said housing exposing a lateral edge of said compass disk for manual rotation thereof.

17. A graphic plotting instrument as recited in claim 1 further comprising a plurality of index points disposed about said compass disk on said first side of said housing, said index points being spaced at least ninety degrees of arc from one another.

18. A graphic plotting instrument as recited in claim 1 further comprising a compass scale on said first side of said housing corresponding to said compass rose scale and a plurality of distance scales, said distance scales corresponding to scaled markings on said cursor lines.

19. A graphic plotting instrument as recited in claim 3 wherein one of said rails is detachable to permit removal of said cursor disk and said compass disk.

20. A graphic plotting instrument as recited in claim 1 wherein said cursor disc comprises a pair of sight vanes disposed on the perimeter thereof on opposite ends of a diameter of said cursor disc and adapted for taking true or relative bearings, said sight vanes being disposed generally perpendicularly of said first side of said housing.

21. A graphic plotting instrument as recited in claim 1 wherein said plotting side is removable from said housing and is replaceable by another suitably sized plotting slide having a plurality of desired markings thereon.

22. A graphic plotting instrument as recited in claim 21 wherein said another plotting slide is adapted for use as a chart protractor.

23. A graphic plotting instrument as recited in claim 1, 3 or 6 wherein said outer face of said cursor disk and said outer face of said compass disk are flush with one another and are flush with said first side of said housing, and wherein said compass disk and said cursor disk are recessed into a well formed in said first side of said housing.

24. A graphic plotting instrument as recited in claim 5 further comprising an arcuate notch disposed on one end of said slide and an arcuate pocket disposed on a lateral side of said housing and exposing a lateral edge of said compass disk for manual rotation thereof, said arcuate notch and said arcuate pocket being aligned when said first point is aligned with said central point.

25. A graphic plotting instrument for solving marine navigational vector problems comprising:
  a housing having a first side and a second side;
  a cursor disk rotatably mounted in a well on said first side of said housing and being rotatable about a central point, an outer face of said cursor disk having a pair of orthogonal scaled primary cursor lines intersecting at said central point and a plurality of secondary cursor lines parallel to at least one of said primary cursor lines and forming a cord on said outer face;
  an annular compass disk rotatably mounted in said well in said first side of said housing around the perimeter of said cursor disk and being concentric therewith, said compass disk being rotatable independently of said cursor disk about said central point and having a compass rose scale displayed on an outer face thereof, said outer face of said annular compass disk being flush with said outer face of said cursor disk and with an outer face of said first side of said housing;
  a pair of spaced parallel rails disposed on said first side of said housing and extending along said housing in a longitudinal direction;
  an elongated, transparent slide captured between said rails and slidable in said longitudinal direction across said outer face of said compass disk and said outer face of said cursor disk, said plotting slide having a pair of orthogonal lines disposed thereon, one of said orthogonal lines extending in said longitudinal direction intermediate said rails along said transverse center of said slide, the point of intersection of said two orthogonal lines being alignable over said central point by sliding said slide longitudinally, said plotting slide further including radial lines radiating from said point of intersection of said orthogonal lines, parallel lines extending parallel to said one orthogonal line, and concentric arcs having said point of intersection of said orthogonal lines as their common center;
  handle means slidably mounted on said housing; and
  a knob disposed on said second side of said housing and manually rotatable about said central point for rotation of said cursor disk.

* * * * *